Jan. 28, 1969      L. C. LYNNWORTH      3,423,993
ROLLING ULTRASONIC TRANSDUCER
Filed July 20, 1966                              Sheet 1 of 2
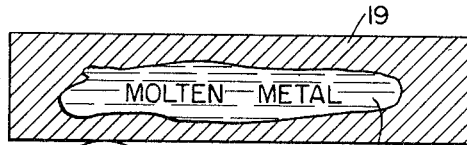
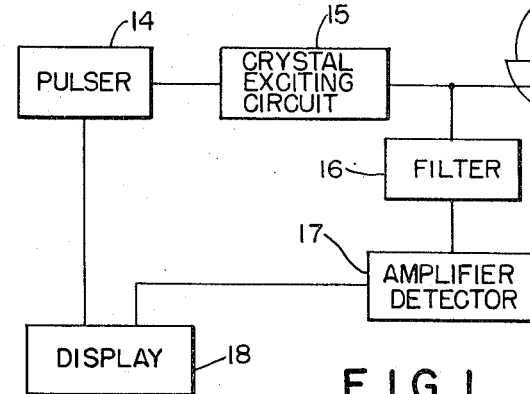
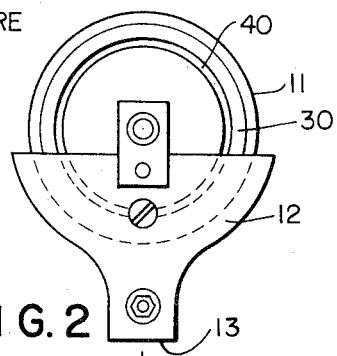
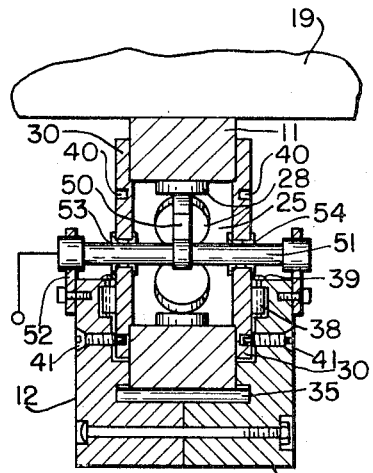
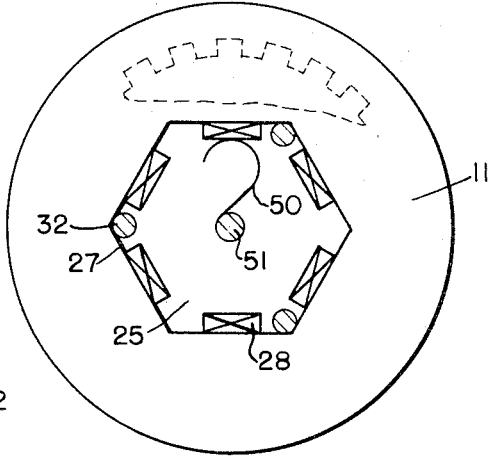
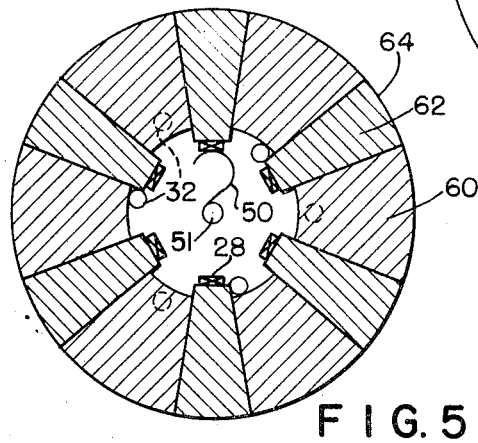
INVENTOR.
LAWRENCE C. LYNNWORTH
BY Weingarten,
Orenbuch &
Lahive
ATTORNEYS Jan. 28, 1969 L. C. LYNNWORTH 3,423,993
ROLLING ULTRASONIC TRANSDUCER
Filed July 20, 1966 Sheet 2 of 2
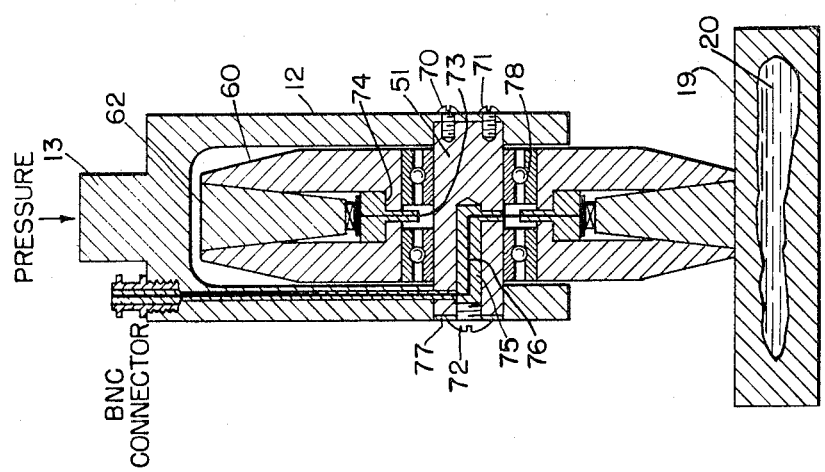
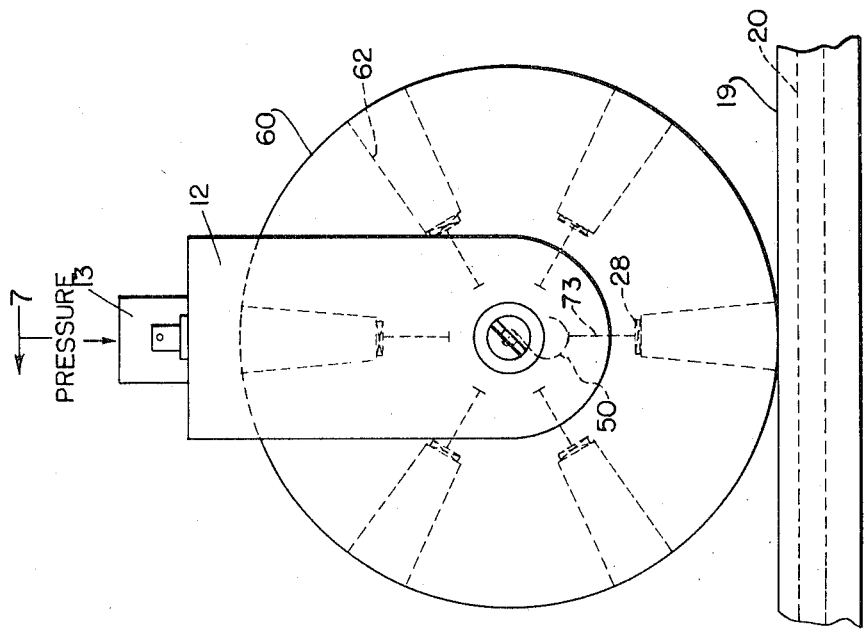
INVENTOR.
LAWRENCE C. LYNNWORTH
BY Weingarten,
Orenbuch &
Lahive
ATTORNEYS United States Patent Office 3,423,993
Patented Jan. 28, 1969

3,423,993
ROLLING ULTRASONIC TRANSDUCER
Lawrence C. Lynnworth, Waltham, Mass., assignor to Parametrics, Inc., Waltham, Mass., a corporation of Massachusetts
Filed July 20, 1966, Ser. No. 566,605
U.S. Cl. 73—71.5        12 Claims
Int. Cl. G01n 29/00

ABSTRACT OF THE DISCLOSURE

An ultrasonic inspection transducer for testing elongated bodies at high temperatures. A roller element of heat resistant material has a central opening in which are mounted a plurality of transducers sequentially energized as the element rolls on the test object.

---

This invention relates in general to ultrasonic transducers and more particularly to an ultrasonic transducer for providing rolling coupling to materials at high temperatures.

Non-destructive ultrasonic measurements in materials are now rather widely used. Flaws or interfaces in an otherwise homogeneous material may be located by measuring the transit time required for a pulse of ultrasonic energy, applied to the surface, to be reflected from the flaw or interface back to the transducer. Similarly, measurement of the propogation velocity of longitudinal and shear waves within a material can be used to calculate the elastic moduli of the material. In all of these measurements, the ultrasonic transducer must, of course, be coupled to the test material. When the test material is itself moving, then the ultrasonic transducer must be coupled to the material in a fashion which is compatible with the movement. For applications such as the measurements of tubes and bars in production, transducer units have been developed which use rotating members to couple longitudinal waves into and out of the test pieces. One such prior art wheel type search unit has a rolling coupler which may be generally described as a rubber tire inflated with a liquid, which typically might be a water and antifreeze solution. Piezoelectric crystals, or other generators of longitudinal ultrasonic waves, are immersed within the fluid and, upon excitation of these generators, ultrasonic waves are transmitted radially outward through the fluid couplant to the surface of the rubber tire, and after passing through the tire, are then coupled to the test piece. In another arrangement, one or more transducers are housed in a wheel like structure, and are oriented to transmit pulses toward and receive pulses from the piece being tested at the hub or center of the transducer unit. Thus, the transducer unit is coaxial with the test piece, and can be rotated about this common axis to inspect round rod and tubing stock at high speeds. Still another type of transducer coupling system for testing moving stock uses fixed transducers with a fluid path provided between transducers and test material.

The prior art transducers described above are, however, limited to generating only longitudinal waves since the couplant between the generating crystal and the contacting surface is a fluid coupling. Thus, where shear wave inspection is required, the shear waves can be generated only by means of mode conversion at the surface of the test piece. Another difficulty with these transducers is their limitation to relatively low temperature operation. Many measurement situations, however, call for high temperature operation such as the measurement of billets and bars in steel production. In these applications it may be required to measure both longitudinal and shear wave velocities within the test material. Such measurements, for example, can produce data enabling the modulus of elasticity to be calculated. Since the surface of the test material may be at temperatures as high as 2000° F. to 2500° F., or higher in certain cases, the prior art transducers cannot be used.

It is, therefore, a primary object of the present invention to provide an ultrasonic transducer for coupling both longitudinal and shear waves into a test piece at high surface temperatures.

It is another object of the present invention to provide an ultrasonic transducer having a roller contact with the test piece and which is suitable for operations at high temperatures.

Broadly speaking, the transducer of the present invention includes a roller element formed of a refractory material or heat resistant alloy, this element having a circular or polygonal hollow core. When the core is polygonal, on each of the polygon faces there is mounted a piezoelectric crystal or other suitable generator of ultrasonic waves. The material between the crystal and the periphery of the roller is selected to have good ultrasonic transmission characteristics. The roller is mounted in a housing so that it may be brought into a pressure contact with the surface of the test piece and rotated either by means of a driving source such as a motor and gear combination or by means of rolling friction. The roller includes means for coupling electrical energy to each one of the ultrasonic generators as the roller rotates so that only the generator aligned with the contact point between the roller and test piece is generating ultrasonic energy.

Other objects and advantages will become apparent from the following detailed descriptions when taken in conjunction with the accompanying drawings in which:

FIG. 1 is an illustration in block diagrammatic form of the ultrasonic transducer of this invention;

FIG. 2 is a side elevational view of an ultrasonic transducer constructed in accordance with the principles of this invention;

FIG. 3 is a cross sectional view taken along the line 3—3 of FIG. 2;

FIG. 4 is a side elevational view of the coupling roller of the transducer illustrated in FIG. 3; and FIG. 5 is a side elevational view of a second embodiment of a coupling roller suitable for use in the transducer of this invention;

FIG. 6 is a side elevational view of a third embodiment of a transducer constructed in accordance with the principles of this invention; and FIG. 7 is a cross sectional view taken along the line 7—7 of FIG. 6.

Referring now to FIG. 1, the ultrasonic transducer 10 is shown in contact with a test piece 19, which typically may be a metal bar having a molten metal core 20. One use of such a system is to measure the solid skin thickness of continuously cast metal between the contact roller 11 of the transducer 10 and the liquid-solid interface between the molten metal and the solid material. The contact roller 11 is rotatably mounted in a housing 12 with pressure against the bottom surface 13 of the housing provided for a pressure coupling between the contact roller 11 and the test piece 19. Circuitry is electrically connected to the contact roller 11 both for exciting the ultrasonic generator within the roller 11 and for determining the time required for an ultrasonic pulse emitted at the surface of roller 11 to be reflected from the liquid-solid interface and returned to the ultrasonic generator. The circuitry is conventional and includes a pulser 14 connected to a crystal exciting circuit 15 which is in turn connected to the transducer. An amplifier detector unit 17 is connected through a filter 16 directly to the transducer. The output from the amplifier detector 17 as well as a second output from pulser 14 is connected to a display and readout unit 18. This circuitry provides for pulses from pulser 14 to trigger the crystal exciting circuit 15 thereby exciting the ultrasonic generator within the coupling roller 11 at a specific time. The reflected pulse from the interface is then connected through the filter 16 to an amplifier detector 17 which amplifies it and provides an output signal to the display 18. Since the display unit, which might be an oscilloscope, also has been triggered by the pulse from pulser 14, then the output indicates the time elapsed between the initiation of the exciting pulse at the ultrasonic generator and the return of the reflection. This transit time is in turn a measure of the distance between the point of contact of the roller 11 with the test piece 19 and the solid liquid interface of the molten metal 20. The electrical delays and acoustic delay in the roller 11 can be measured and separated from the total transit time either manually or automatically as required.

FIGS. 2, 3 and 4 show the detailed construction of the ultrasonic transducer illustrated generally in FIG. 1. The coupling roller 11 is formed as a generally solid cylindrical piece with a hollow hexagonal core 25. The cylinder roller 11 is composed of a material having high wear characteristics, a high melting point and excellent sonic transmission characteristics. Suitable materials for this purpose are tungsten and tungsten carbide. Each of the hexagon faces 27 has bonded to it a suitable generator of ultrasonic energy 28. This generator may be formed, for example, of a piezoelectric crystal such as lead zirconate titanate. On either side of the roller are mounted cover plates 30, which are formed of steel and which serve to close in the hexagonal axial opening 25 within the roller. These cover plates 30 are held in place by three screws 32, with the bodies of these screws 32 engaging the angles between adjacent faces of the hexagonal shaped opening 25 in the roller 11.

The roller 11 is mounted within a housing 12 which is formed with an opening to receive and support the roller 11 upon a series of needle bearings 35 which are positioned in the housing parallel to the axis of rotation of the roller 11 and resting against a portion of the outer curved surface of the roller 11. A second set of bearings 38 are mounted within the housing 12 to rotate on an axis normal to the axis of rotation of the roller 11 and these bear against the cover plates 30 to provide alignment for the contact roller 11 in the plane normal to its axis of rotation. These bearings 38 are pivoted on screws 39. Each of the cover plates 30 also contains a circular groove 40 on its outer surface. A pair of dog point screws 41 are mounted on either side of the housing 12 so that their points engage the grooves 40 on the cover plate 30. The tolerances between the size of the point on the dog point screw 41 and the groove 40 are sufficiently wide so that this does not provide a bearing surface in normal use when pressure is applied against the bottom surfaces 13 of the housing 12 in order to bring the contact roller 11 into pressure contact with a test piece. The purpose of the set screws 41 and groove 40 is to retain the contact roller within the housing when it is being transported or is otherwise not in bearing contact with a test piece.

The transducer also includes an arrangement for providing an electrical exciting voltage to successive ones of the ultrasonic generators 28 as the roller rotates. This arrangement includes a contact shoe 50 which is fastened to an axle 51 which passes through central openings 53 within the cover plate and bears against a pair of nylon collars 54. This axle 51 is fixed in position and supported by a pair of insulating mounting brackets 52 which are, in turn, mounted to the housing 12. The axle 51 does not rotate with rotation of the roller and hence, as the contact roller 11 rotates, successive ones of the ultrasonic generator 28 come in contact with the shoe 50. The electrical connection to the shoe 50 may be made in a variety of ways, for example, axle 51 may be made electrically conducting and one electrical lead may be connected directly to it with the other electrical lead being connected to the housing 12. The current would then pass through the axle 51, the shoe 50, the ultrasonic generator crystal 28, the contact roller 11, the bearings 35, and the housing 12. In another arrangement the axle 51 may be tubular and a coaxial cable run inside the axle with electrical contact from the center electrode of the cable to the shoe 50 being made through an insulating bushing.

In operation the transducer has pressure applied to the bottom surface 13 of the housing 12 to bring the roller into a fairly high pressure contact with the test piece to be measured. The rotation of the roller can either be produced by frictional contact at the moving test piece 19 or supplied by a conventional motor and gear driving arrangement (not shown) coupled to the transducer roller 11. In order to provide this latter arrangement, the cover plates 30 may be formed with gear teeth as illustrated schematically by the dotted lines in FIG. 4. This transducer may be used to couple either shear or longitudinal waves directly into the test piece since the high pressure contact allows for coupling of shear waves when used with suitable generating crystals. The amount of pressure which is required to efficiently couple shear waves or longitudinal waves from the transducer to the test piece is a function of the surface finishes of the transducer and the test piece. Thus, with typical machined finishes of 125 micro-inches RMS, a pressure between 1000 and 30,000 p.s.i. is required. On the other hand, for a flat surface highly polished 1 micro-inch RMS finish or better, a pressure of about 100 p.s.i. is more than sufficient. Coolants or coupling fluids can significantly enhance the coupling of longitudinal waves, but their contribution to shear wave coupling, especially at elevated temperatures, is negligibly small.

It should be noted that the ultrasonic testing is not completely continuous in this arrangement but rather it is a successive series of tests. For example, if the diameter of the contact roller 11 is four inches and a hexagon cavity employing six crystals is used, an ultrasonic measurement is made every $4\pi/6$ inches of circumference, that is about every two inches of length of stock. While the preferred embodiment of the invention has been described in terms of a hexagon, it is apparent that other polygons such as pentagons, octagons, etc., may be employed, depending upon the number of crystals to be used and the coverage desired. The actual dimensions of the transducer will, of course, depend on the measurement application. In one preferred mode of operation, the radial thickness of the contact roller 11 between the transducer 28 and the periphery of the roller should be sufficient so that the round trip transit time of a sonic pulse through it is substantially greater than the transit time of that sonic pulse from the surface of the test piece 19 to the solid liquid interface 20 and back to the surface. The purpose of this restriction is to avoid confusion between the pulse reflected from the solid liquid interface and various internal reflections within the contact roller 11. Depending upon the application, the relative dimensions may be varied provided only that this confusion is avoided.

While the preferred embodiment has been described in terms of a homogeneous contact roller 11, a second embodiment is illustrated in FIG. 5. In the embodiment of FIG. 5, the roller itself may be formed as a matrix of a suitable steel 60 with a series of radial inserts 62 positioned between the contact surface 64 of the roller and each of the ultrasonic generators 28. The insert 62 may be mechanically retained within the steel matrix 60 by any convenient means such as brazing, welding, taper fitting, press fitting or threading. With this arrangement, the inserts may be formed of a particularly selected material having desirable ultrasonic transmission and temperature characteristics, but which may not be suitable for constructing the entire roller. More particularly, these inserts 62 may be formed of a material which is essentially a single crystal and therefore has characteristics of high sonic transmission and minimum internal reflection due to grain boundaries. Tungsten and other refractory materials are presently available as single crystals, as is also titanium carbide. As an alternative to the construction of FIG. 5, the roller transducer consisting of a matrix plus inserts may also be arranged as illustrated in FIGS. 6 and 7. The required coupling pressure is conveyed through needle or roller bearings 78. Electrical signals are conveyed from the connector atop the housing 12 through the conductor lead 76 to the shoe 50 to electrode extension 73 to one of the ultrasonic generators 28, when this generator is aligned to transmit into this test piece 19. The lead 76 is potted in place with the insulating compound 75, which may be epoxy or RTV rubber. Electrode extensions 73 are held in place by resilient rubber insulators 74, which also dampen vibrations of the generator 28. The non-rotatable axle 51 is prevented from rotating by retaining screws 70 and 71. Screw 72 and washer 77 complete the shielded enclosure around lead 76.

The ultrasonic generators 28 would generally be arrayed in a regular polygon fashion, so that as the roller transducer rolls along the test piece, measurements are obtained at regular intervals.

Another advantage of using inserts 62 is that the hollow core in roller 11 may be circular, which shape is more easily fabricated than a polygon.

Having described the invention, various modifications and improvements will now occur to those skilled in the art and the invention described herein should be construed as limited only by the spirit and scope of the appended claims.

What is claimed is:
1. An ultrasonic transducer for measurement of ultrasonic transmission characteristics of a test material comprising a roller element fabricated of a heat resistant material and formed generally as a solid cylindrer having a central opening extending axially therethrough,
   a plurality of generators of ultrasonic energy, one of said generators being bonded to a facet within said cylinder for transmitting generated ultrasonic energy radially outward through said roller element,
   means for rotatably supporting said roller element in pressure rolling contact with said material to be measured, and
   connecting means for making electrical connections to successive ones of said ultrasonic generators as said roller element rotates.

2. Apparatus in accordance with claim 1 wherein said central opening is polygonal and where one of said generators is mounted on each face of said polygonal opening.

3. An ultrasonic transducer in accordance with claim 1 wherein said means for rotatably supporting said roller element comprises
   a housing having an opening in one face thereof, said opening having a curved surface for receiving the curved outer surface of said roller element,
   a plurality of needle bearings mounted along said housing curved surface for rotatably supporting said roller element, and
   retaining means for retaining said roller element within said opening in said housing.

4. An ultrasonic transducer in accordance with claim 1 wherein said connecting means comprises
   an axle non-rotatably mounted on said means for supporting said roller element, said axle being positioned along the axis of rotation of said roller element and extending through said central opening of said roller element, and
   an electrically conducting contact shoe fixed to said axle and extending radially outward therefrom to make a sliding electrical contact with successive ones of said ultrasonic generators as said roller element is rotated.

5. Apparatus in accordance with claim 3 wherein said roller element includes first and second cover plates fastened on first and second flat ends of said cylindrical roller element thereby enclosing said central opening, and wherein said retaining means comprises circular grooves in each of said cover plates and studs mounted in said housing and positioned to engage said grooves permitting rotation of said roller element but restraining translational motion of said roller element.

6. Apparatus in accordance with claim 4 wherein said axle is made electrically conducting and further including insulating members insulatedly supporting said axle on said means for rotatably supporting said roller element.

7. An ultrasonic transducer in accordance with claim 3 wherein said generators of ultrasonic energy are piezoelectric crystals.

8. A transducer in accordance with claim 7 wherein said roller element is fabricated of tungsten carbide.

9. A transducer in accordance with claim 1 wherein said roller element is formed of a matrix of a first material and inserts of a second heat resistant material, said inserts being positioned to extend radially outward to the periphery of said cylinder over an area at least equal to the transmitting surface area of said generator of ultrasonic energy.

10. A transducer in accordance with claim 9 wherein said inserts are formed of a single crystal solid material.

11. A transducer in accordance with claim 10 wherein said insert material is titanium carbide.

12. A transducer in accordance with claim 10 wherein said insert material is tungsten.

References Cited

UNITED STATES PATENTS

| 2,724,783 | 11/1955 | Renaut | 310—8.7 |
| 3,074,267 | 1/1963 | Martin | 73—67.5 |
| 3,315,520 | 4/1967 | Carnevale et al. | 73—67.5 |

FOREIGN PATENTS 1,411,238   8/1965   France.

RICHARD C. QUEISSER, Primary Examiner.

JOHN P. BEAUCHAMP, Assistant Examiner.

U.S. Cl. X.R.

310—8.7